US009776735B2

(12) United States Patent
Williams

(10) Patent No.: US 9,776,735 B2
(45) Date of Patent: Oct. 3, 2017

(54) VERY LOW PROFILE ANTI COLLISION LIGHT

(71) Applicant: The Boeing Company, Chicago, IL (US)

(72) Inventor: Timothy L. Williams, Burien, WA (US)

(73) Assignee: The Boeing Company, Chicago, IL (US)

( * ) Notice: Subject to any disclaimer, the term of this patent is extended or adjusted under 35 U.S.C. 154(b) by 82 days.

(21) Appl. No.: 14/711,128

(22) Filed: May 13, 2015

(65) Prior Publication Data

US 2016/0332746 A1 Nov. 17, 2016

(51) Int. Cl.
| | | |
|---|---|---|
| *B64D 47/06* | (2006.01) | |
| *B64D 47/02* | (2006.01) | |
| *B64D 47/04* | (2006.01) | |
| *F21S 4/24* | (2016.01) | |
| *F21S 4/22* | (2016.01) | |
| *F21V 5/04* | (2006.01) | |
| *B64D 47/00* | (2006.01) | |

(52) U.S. Cl.
CPC .............. *B64D 47/06* (2013.01); *B64D 47/02* (2013.01); *B64D 47/00* (2013.01); *B64D 47/04* (2013.01); *F21S 4/22* (2016.01); *F21S 4/24* (2016.01); *F21V 5/04* (2013.01); *F21V 5/046* (2013.01)

(58) Field of Classification Search
CPC ........ B64D 47/06; B64D 47/02; B64D 47/04; B64D 47/00; F21K 9/50; F21Y 2101/02; F21W 2101/06; F21S 4/22; F21S 4/24; F21V 5/04; F21V 5/046
See application file for complete search history.

(56) References Cited

U.S. PATENT DOCUMENTS

| | | | |
|---|---|---|---|
| 2009/0016069 A1* | 1/2009 | McDermott | F21V 5/046 362/311.06 |
| 2012/0299017 A1* | 11/2012 | Chen et al. | F21V 13/02 257/98 |
| 2014/0160774 A1* | 6/2014 | Lapujade | B64D 47/06 362/470 |
| 2015/0062890 A1* | 3/2015 | Camarota | F21V 5/04 362/223 |
| 2015/0062921 A1* | 3/2015 | Wang He et al. | F21V 5/046 362/311.02 |

FOREIGN PATENT DOCUMENTS

KR 20040046635 A * 6/2004

OTHER PUBLICATIONS

Author Unknown, Code of Federal Regulations, 14, Parts 1 to 59, Aeronautics and Space, Published by: Office of the Federal Register National Archives and Records Administration, revised Jan. 1, 2004, pp. 1-1160.

* cited by examiner

*Primary Examiner* — Y M. Lee
(74) *Attorney, Agent, or Firm* — MH2 Technology Law Group LLP

(57) ABSTRACT

A light configured to be coupled to a surface, where the light includes a light source configured to emit light in three dimensions and a lens configured to direct a majority of the light emitted by the light source outwardly from the light source in directions along the surface. The light may be an anti collision light for an aircraft.

27 Claims, 7 Drawing Sheets

VERY LOW PROFILE ANTI COLLISION LIGHT

FIELD

The present teachings relate to the field of aircraft safety systems and, more particularly, to aircraft anti collision lighting systems including one or more anti collision lights.

BACKGROUND

United States Federal Aviation Administration regulations require anti collision lighting on commercial and other aircraft. For example, C.F.R. §23.1401 specifies the requirement for anti collision lighting. Further, the anti collision lighting must meet specific criteria with regard to, for example, field of coverage, flashing characteristics, color, light intensity, and minimum effective intensities.

Anti collision lighting typically includes a light source or lamp, such as an incandescent or halogen bulb, and a lens that covers and protects the light source. The light source and lens are attached to the exterior surface of the aircraft, for example on an upper and/or or lower surface of a fuselage, wing, vertical stabilizer, and/or horizontal stabilizer of the aircraft.

While anti collision lighting is an essential safety component, the lighting can adversely impact operational characteristics of an aircraft. For example, the bulb that provides the light source and the lens that protects the bulb must extend from the aircraft exterior surface by a distance to be sufficiently visible from a low angle relative to the aircraft. Some lenses in anti collision lighting systems can extend at least 3.0 inches, and in some designs up to 6.0 inches, away from the aircraft exterior surface. This protrusion of the lens away from the aircraft surface can result in the lens extending into the airstream during operation of the aircraft, thereby creating significant aerodynamic drag increasing fuel consumption and carbon dioxide emissions, etc. For example, the drag created by some anti collision lighting can be equivalent to carrying an additional 250 pounds of payload.

Further, the lighting systems add additional weight to the aircraft, which also increases fuel consumption. Some anti collision lighting systems can add an additional 3 to 4 pounds of weight to the aircraft.

Moreover, because the lens that protects the bulb extends away from the aircraft surface by up to 6.0 inches, the lens must be manufactured from a durable material that resists abrasion and other damage from particles in the airstream such as dust, rain, ice, etc. Conventional lenses may be manufactured from relatively expensive materials such as glass and high-density polymers with expensive coatings to protect the lens from abrasion.

An anti collision lighting system having a decreased impact on aerodynamic drag and fuel consumption, reduced power draw from the aircraft electrical system, reduced weight, and a lower cost would be desirable.

SUMMARY

The following presents a simplified summary in order to provide a basic understanding of some aspects of one or more embodiments of the present teachings. This summary is not an extensive overview, nor is it intended to identify key or critical elements of the present teachings, nor to delineate the scope of the disclosure. Rather, its primary purpose is merely to present one or more concepts in simplified form as a prelude to the detailed description presented later.

An embodiment can include a light configured to be coupled to a surface, the light including a light source configured to emit light in three dimensions and a lens configured to direct a majority of the light emitted by the light source outwardly from the light source in directions along the surface. The directions the majority of the light is directed along the surface can include all the directions along the surface. The light can define an area on the surface wherein the light source is positioned within the area and the directions include directions radially outward from the light source along the surface.

The light can provide an anti collision light for an aircraft, where the light further includes a plurality of light emitting diodes (LEDs), wherein each LED includes a light emitting surface configured to emit light and a width across the front surface, a lens including a first surface configured to cover the plurality of LEDs and an exterior surface of the aircraft, a second surface opposite the first surface, and an edge having a height that extends between, and intersects, the first surface and the second surface, wherein the lens is configured to focus the majority of the light emitted from the plurality of LEDs outward through the edge. In an embodiment, the height of the edge is equal to 7.0 times a width of one LED, or less. In another embodiment, the anti collision light is configured to protrude from the exterior surface of the aircraft by a distance equal to 7.0 times a width of one LED, or less.

The lens can further include a first surface, a second surface opposite the first surface, and a third surface at a level interposed between a level of the first surface and a level of the second surface. The third surface can define at least a portion of a recess in the lens to receive the plurality of LEDs.

The light source may include a plurality of light emitting diodes (LEDs) and the light may further include a continuous polymer carrier that physically connects the plurality of LEDs into a light strip.

The lens may further include a first surface, a second surface opposite the first surface, a third surface, and a recess defined, at least in part, by the third surface. The first surface of the lens may have a first plane, the second surface of the lens may have a second plane, and the third surface of the lens may have a third plane at a level that is interposed between the first plane and the second plane. The first plane, the second plane, and the third plane may be substantially parallel, each with the other, and the light strip may be received within the recess.

The light can further include a base, the base having a mounting surface, wherein the light source is positioned between the mounting surface and the lens.

The light can further include a plurality of light emitting diodes (LEDs) that provide the light source, a continuous polymer carrier that physically connects the LEDs into a light strip, and a circuit substrate electrically coupled to the light strip, wherein the circuit substrate is positioned on a surface of the base within a periphery established by the light strip. The base can further include a post configured to extend through an opening in the exterior surface of the aircraft, and a channel through the post. The circuit substrate can include an electrical interconnect electrically coupled with the circuit substrate, and the electrical interconnect extends through the channel in the post.

The light may include at least one fastener that attaches the lens to the base extends through a first opening through the lens and a second opening through the base. The at least one fastener can be configured to attach the lens and the base to an aircraft surface, and extend through a third opening through the aircraft surface.

The lens may include a first surface, a second surface opposite the first surface, and an edge that intersects the first surface and the second surface, and the edge intersects the first surface of the lens at an angle of 90°, or at an angle of from 30° to 60°.

The light can further include a reflective coating on a surface of the lens that reflects light emitted by the light source back into the lens.

An aircraft can include an anti collision lighting system, the anti collision lighting system having an anti collision light with a lens. The lens can include an upper surface, a lower surface, an edge that extends between, and intersects, the upper surface and the lower surface, and an intermediate surface at a level between the lower surface and the upper surface, the intermediate surface defining at least a portion of a recess. The anti collision lighting system can further include a light strip having a plurality of light sources positioned within the recess, a pedestal including a raised mounting surface having a sidewall, wherein the plurality of light sources are mounted to the sidewall and the raised mounting surface is positioned within the recess, a flange that intersects the sidewall, and an aircraft surface, wherein the anti collision light is attached to the aircraft surface. The aircraft can further include at least one fastener that attaches the lens to the pedestal and to the aircraft surface, and extends through a first opening through the lens, a second opening through the flange, and a third opening in the aircraft surface.

The aircraft can further include an exterior surface, and the anti collision light can be configured to protrude from the exterior surface of the aircraft by a distance of 0.5 inches or less.

The aircraft can further include an exterior surface, where the anti collision light is configured to protrude from the exterior surface of the aircraft by a distance of 0.185 inches or less.

A method of directing light can include providing a plurality of light emitting diodes (LEDs), wherein each LED includes a front surface configured to emit light and a width across the front surface, providing a lens having a lower surface configured to overlie the plurality of LEDs, an upper surface opposite the lower surface, and an edge having a height that extends between, and intersects, the lower surface and the upper surface, wherein the height of the edge is equal to 7.0 times the width of one LED, or less. The method can further include encasing the plurality of LEDs within the lens, wherein the anti collision light is configured to emit the light from the plurality of LEDs, through the lens, and out of the edge of the lens.

The method may further include attaching the anti collision light to an exterior surface of an aircraft wherein, subsequent to the attaching, the anti collision light protrudes from the exterior surface of the aircraft by a distance equal to 7.0 times the width of one LED, or less. The method may further include mounting the plurality of LEDs to a sidewall of a raised mounting surface of a pedestal, wherein the sidewall extends from a flange of the pedestal, and attaching the lens to the flange of the pedestal. Further, the pedestal may be attached to the exterior surface of the aircraft using a plurality of fasteners.

An anti collision light for an aircraft can include a lens having a lower surface configured to overlie an exterior surface of the aircraft, an upper surface opposite the lower surface, and an edge that extends between, and intersects, the lower surface and the upper surface, wherein the anti collision light is configured to protrude from the exterior surface of the aircraft by a distance of 0.5 inches or less.

DRAWINGS

The accompanying drawings, which are incorporated in, and constitute a part of this specification, illustrate embodiments of the present teachings and, together with the description, serve to explain the principles of the disclosure. In the figures.

It should be noted that some details of the FIGS. have been simplified and are drawn to facilitate understanding of the present teachings rather than to maintain strict structural accuracy, detail, and scale.

DESCRIPTION

Reference will now be made in detail to exemplary embodiments of the present teachings, examples of which are illustrated in the accompanying drawings. Wherever possible, the same reference numbers will be used throughout the drawings to refer to the same or like parts.

The technology described herein may be used in any system where lighting is desired. Examples include, but are not limited to, aerospace vehicles, military, commercial, or private flight vehicles, reusable spacecraft, lighting systems for military, commercial, or private purposes, and re-entry systems. As used herein, "aircraft" refers to any vehicle capable of flight within an atmosphere, partial vacuum, and/or vacuum.

An embodiment of the present teachings can provide a low profile anti collision lighting system that is visible from both low angles and high angles and has significant advantages compared to some conventional systems. For example, the disclosed lighting system has reduced aerodynamic drag, reduced weight, and a lower power requirement compared to conventional anti collision lighting, and provides a light output within required visibility specifications and regulations. Further, the disclosed low-profile anti collision system can have a lower weight than conventional systems, thereby decreasing fuel consumption and carbon dioxide emissions. Additionally, because the low-profile lighting system includes a low-profile lens that extends away from the aircraft surface by a reduced distance, the lens has a decreased vulnerability to dust and debris, and therefore may be manufactured from a less expensive material than conventional lenses. An arrangement of a light source, such as a plurality of LED's, at least partly enables the low profile design of the anti collision light.

Figure 1:
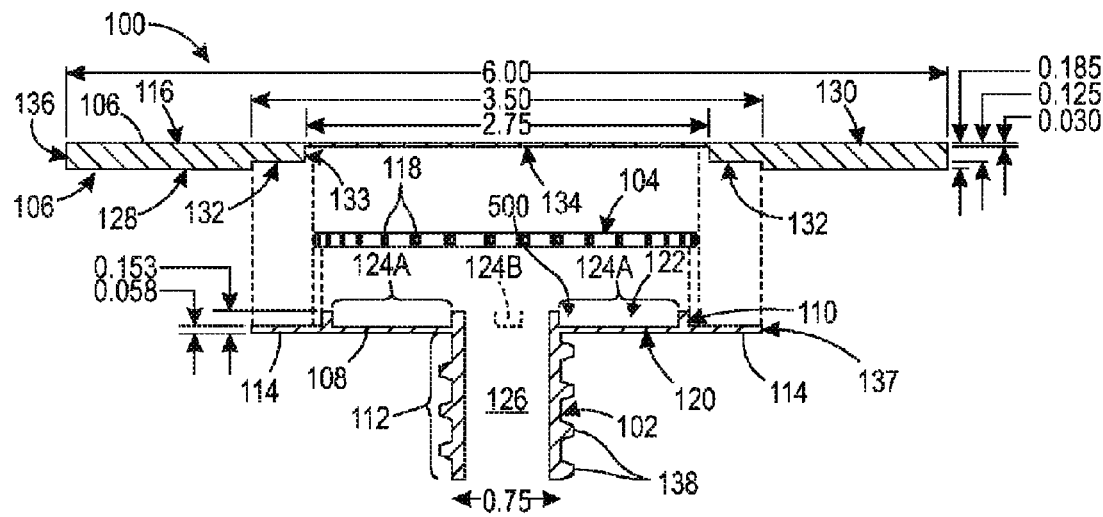
FIG. 1 is an exploded sectional view of an anti collision light in accordance with an embodiment of the present teachings.
Figure 2:
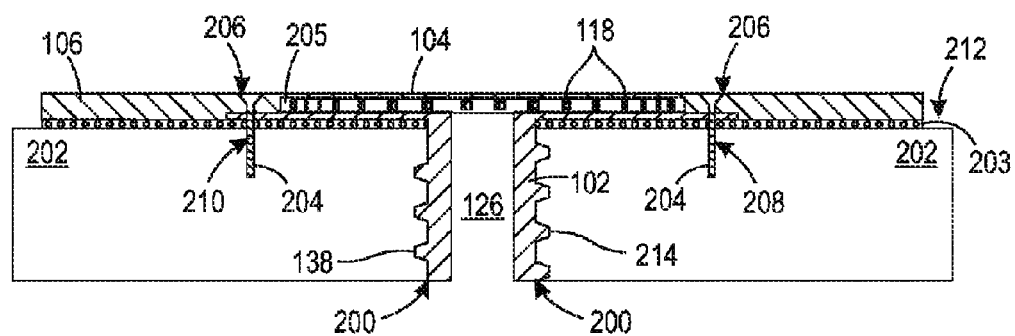
FIG. 2 is an assembled sectional view of an anti collision light in accordance with an embodiment of the present teachings.
Figure 3:
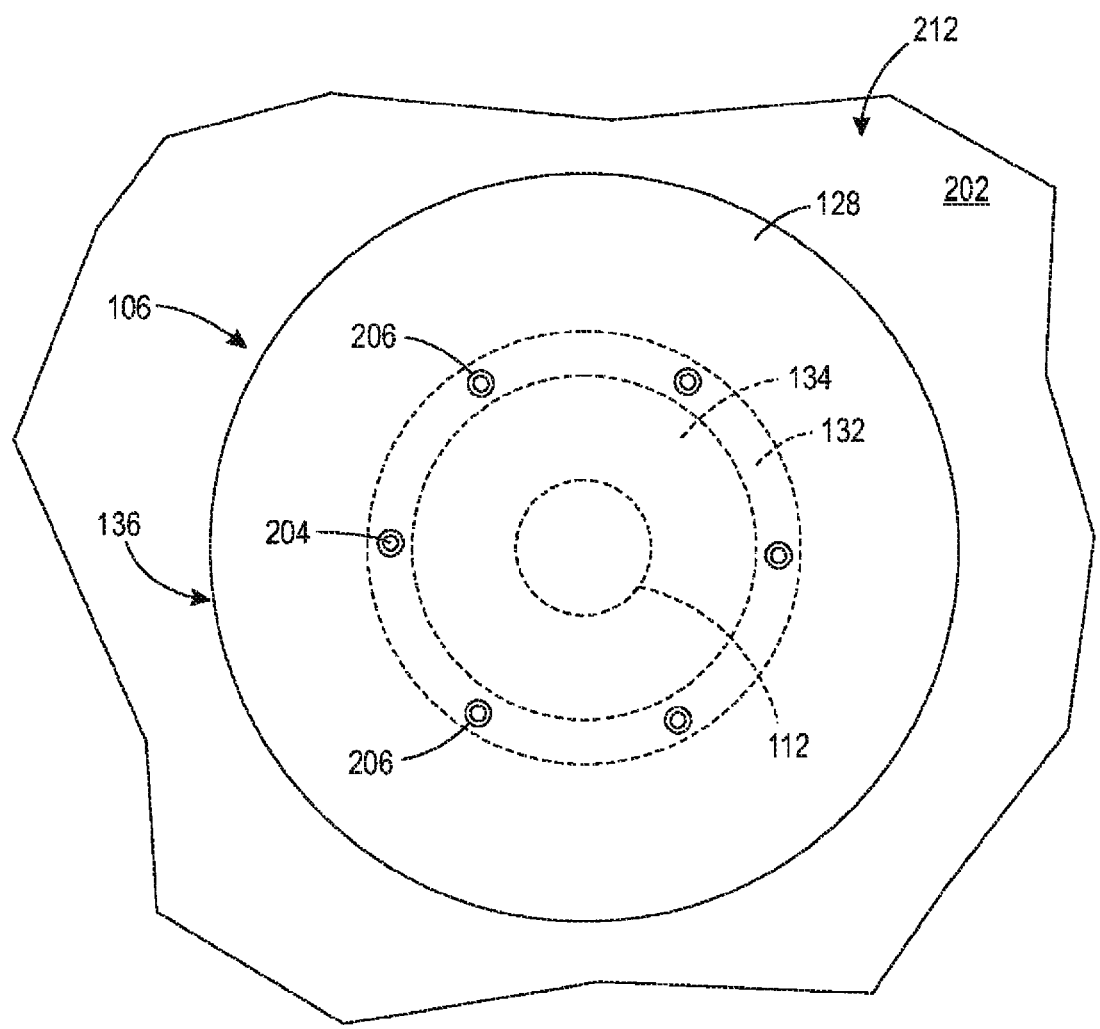
FIG. 3 is a plan view of the FIG. 2 embodiment.

An anti collision lighting system 100 according to an embodiment of the present teachings is depicted in FIGS. 1-3, where FIG. 1 is an exploded sectional view, FIG. 2 is an assembled sectional view, and FIG. 3 is a plan view. Various measurements (in inches) are depicted in FIG. 1. The embodiment depicted in FIG. 1 generally includes a base or pedestal 102, a light strip 104, and a lens 106. While the teachings are discussed with regard to a lens as a light guide, it will be understood that the present teachings can be applied to any light guide, where the light guide is a structure or technique that is used to direct or redirect light toward a desired direction. It will be further understood that the FIGS. are generalized schematic depictions and that an anti collision lighting system may include other structures that are not depicted for simplicity, while various depicted structures may be removed or modified. The dimensions shown are for descriptive purposes only and may vary to accommodate different platform integration requirements. In FIGS. 1 and 2, the pedestal 102 and lens 106 are depicted in cross section, while the light strip 104 is a perspective depiction.

The pedestal 102 includes a raised mounting surface 108 having a sidewall 110 to which the light strip 104 is mounted using, for example, an adhesive (not individually depicted for simplicity) such as a liquid adhesive or a double-sided pressure sensitive adhesive. The pedestal 102 further includes a post 112 that is inserted into an opening 200 (FIG. 2) in the aircraft surface 202. Additionally, the pedestal 102 can include a flange 114 to which the lens 106 may be mounted using, for example, one or more fasteners 204 (FIG. 2), such as one or more screws, bolts, pegs, or other fasters, each of which may be countersunk into a hole 206 in the lens 106 and/or the flange 114 and thereby flush mounted with an upper or top surface 116 of the lens 106. Other fasteners and attachment techniques are contemplated. The flange 114 may also be used to secure the lens 106 and pedestal 102 to the surface 202 using the fasteners 204 as depicted in FIG. 2. In another embodiment, the post 112 of the pedestal 102 may include threads 138 that are screwed into, and received by, threads 214 in the aircraft fuselage 202. Other types of connections are contemplated, such as a twist lock notch, etc. The pedestal 102 may be manufactured from, for example, a lightweight metal such as aluminum, a metal alloy, or a polymer that is sufficiently resilient under expected stresses and capable of performing as a heat sink for the light strip 104. The raised mounting surface 108, specifically the sidewall 110, extends from the flange 114, and intersects the upper surface 122 of the pedestal 102.

The light strip 104 can include a plurality of individual light sources 118, for example a plurality of light emitting diodes (LEDs). The light strip 104 may be fabricated, for example, in a manner similar to conventional flexible LED tape lights known in the art. The light strip 104 is described in more detail with regard to FIG. 4.

The flange 114 of the pedestal 102 includes a lower surface 120 and the pedestal includes an upper surface 122, where the sidewall 110 is interposed at a level between the lower surface 120 of the flange 114 and the upper surface 122 of the pedestal. The lower surface 120 of the flange may physically contact the aircraft surface 202 as depicted in FIG. 2 during use. Further, the lower surface 120 intersects with the post 112 at a 90° angle, or another angle or angles appropriate for the contours of the surface 202. The upper surface 122 of the pedestal 102 may include a first recess 124A and a second recess 124B that receive a circuit substrate 406 and integrated driver (i.e., drive) electronics 408 of the light strip 104 as described below with reference to FIG. 5. The first recess 124A may be continuous with the second recess 124B. The pedestal 102 further includes a channel 126 through the post 112 and opens at the upper surface 122, for example for routing power and ground to the light strip 104 from a power supply within the aircraft.

The lens 106 can include a lower or bottom surface 128, an upper or top surface 130 that is opposite the lower surface 128, a first intermediate surface 132 at a first level between the lower surface 128 and the upper surface 130, and a second intermediate surface 134 at a second level between the lower surface 128 and the upper surface 130, where the second level is further between the first intermediate surface 132 and the upper surface 130. In this embodiment, the lower surface 128 has a first plane, the upper surface 130 has a second plane, the first intermediate surface 132 has a third plane, and the second intermediate surface 134 has a fourth plane, where the planes are all generally parallel with each other. The lens 106 can further include an edge 136 that intersects the lower surface 128 and the upper surface 130 at a right angle, or another angle as described below. While FIGS. 1 and 2 depict the edge 136 of the lens 106 extending beyond an edge 137 of the flange 114, it will be understood that the lens 106 and pedestal 102 can be configured such that the edge 136 of the lens 106 is vertically aligned or coplanar with, or even recessed from, an edge 137 of the flange 114. In this embodiment, the lens 106 may have only one intermediate surface 134 that at least partially forms a recess that receives the light strip 104 and the raised mounting surface 108, including the sidewall 110.

The lens 106 may be manufactured from a lightweight transparent or translucent material such as a polymer. In another embodiment, the lens 106 may be manufactured from glass. As depicted in FIG. 1, the lens may have a very low maximum thickness or height compared to conventional anti collision lights, and may therefore protrude or extend very slightly from the aircraft surface and have a very low profile. As depicted in FIGS. 1 and 2, the lens 106 may have a maximum thickness or height of 0.185 inches or less and extend away from the aircraft surface by this distance depending, for example, on a height of the light strip 104. Thus, in this embodiment, the anti collision lighting 100, and more particularly the lens 106 and light source 104, are configured to extend or protrude from the surface 202 of the aircraft by no more than 0.185 inches. In another embodiment, the lens 106 may have a thickness of from about 0.125 inches to about 0.375 inches, or 0.5 inches or less, or 0.375 inches or less, and thus protrude or extend from the aircraft surface by a distance equal to the maximum thickness of the lens. In another embodiment, the lens 106 and the lower surface 120 of the pedestal 102 may optionally rest on a synthetic pad 203 such as a polymer pad that functions as a pad or seal, in which case the lens 106 will be configured to extend or protrude from the surface 202 of the aircraft by no more than 0.5 inches, or no more than 0.375 inches, or no more than 0.185 inches, or from about 0.185 inches to about 0.5 inches. In other embodiments, the synthetic pad 203 is omitted. As described above, conventional anti collision light may protrude 3.0 inches or more, for example up to 6.0 inches, from the aircraft surface.

In another embodiment, each LED 118 can include a front, light emitting surface configured to emit light in three dimensions and a back surface attached to or coupled with, for example, the sidewall 110 of the pedestal 102. Alternatively, the LED 118 can be attached to, or coupled with, a different feature of the pedestal 102. Each LED 118 may further include a width that is measured across the front surface. In an embodiment, the edge 136 of the lens 106 may have a height that is equal to about 7.0 times the width of one LED 118, or less. In another embodiment, the edge 136 may have a height that is equal to about 5.0 times the width of one LED 118, or less. In another embodiment, the edge 136 may have a height that is equal to about 3.0 times the width of one LED 118, or less, or about 2.0 times, or less, or about 1.5 times, or less. In an embodiment, the lens 106 can be configured to direct a majority of the light emitted by the light source (e.g., LEDs 118) outwardly from the light source 118 in directions along the surface to which it is attached. In other words, the lens 106 directs the majority of the hemispherically directed light emitted by the LEDs 118 in a substantially planar direction, the substantially planar direction established, or generally bounded, by the upper and lower surfaces of the lens 106, toward the edge 136 of the lens 106. The substantially planar direction of the lens 106 directed light transmits the emitted light out the edge 136 and along the surface to which the lighting system 100 is attached. In an embodiment, the lens 106 directs a majority of the light emitted by the LEDs in all directions (i.e., through 360°) along the surface to which the light is attached, such that light is emitted around the entirety of the edge 136 of the lens 106. In an embodiment, the lens 106 can selectively direct the light emitted by the LEDs in less than all directions, e.g. less than 360° all around the edge 136, such as 90°, 180°, 270°, intermittent angle ranges around the edge 136 such as every other 45°, and the like. In an embodiment, the light 100 defines an area on the surface to which the light 100 is attached, the light 100 is positioned within the area, and the lens 106 directs the light emitted by the LED 118 radially outward from the light source 118 along the surface to which it is attached. In an embodiment, the lens 106 can redirect light emitted from the LEDs 118 such that about 70% or more, or 80% or more, or 90% or more, or about 95% or more, or about 98% or more, of the light emitted from the plurality of LEDs 118 can be emitted through the edge 136 of the lens 106. Thus, while the light may be emitted from each LED 118 of the plurality of LEDs 118 in three dimensions, the lens 136 redirects the emitted light such that it is emitted from the edge 136 of the lens 106.

FIG. 2 depicts the FIG. 1 assembly attached to the aircraft surface 202, and FIG. 3 is a plan view of the FIG. 2 structure. In an embodiment, the light strip 104 and the top surface 122 of the pedestal 102 may be positioned into a first recess defined, at least in part, by the second intermediate surface 134 as depicted in FIG. 2. The flange 114 of the pedestal 102 may be positioned into a second recess defined, at least in part, by the first intermediate surface 132. Further, the fastener 204 may be countersunk into the hole 206 in the lens 106, through a hole 208 in the flange 114 of the pedestal 102, and through or into a hole 210 in the surface 202. The surface 202 may be an exterior surface of the aircraft fuselage, wing, vertical stabilizer, horizontal stabilizer, or another exterior surface of the aircraft.

In another embodiment, the lens 106 may be bonded to the flange 114 and the light strip 104 using a transparent adhesive 205 (FIG. 2), where the plurality of LEDs 118 are positioned between the mounting surface 110 and the lens 106. Adhesive 205 may be, for example, a transparent silicone or another transparent adhesive. If the adhesive 205 is not used, an air gap may remain between the LEDs 118 of the light strip 104 and surface 133 (FIG. 1) of the lens 106. This air gap can result in more light being reflected away from the surface 133 of the lens 106, and an overall decrease in light output from the anti collision lighting system 100. Because the adhesive 205 has a density or optical index that is closer to the density or optical index of the lens 106, less light is reflected off of surface 133 resulting in an overall increase in light output at lens edge 136. Thus, the adhesive 205 effectively functions as a part of the lens, may provide a light that has no air gap between the light source 118 and the lens, and may have a beneficial effect on the light output of the anti collision light 100. Embodiments including both the adhesive 205 and the one or more fasteners 204 are contemplated.

Figure 4:
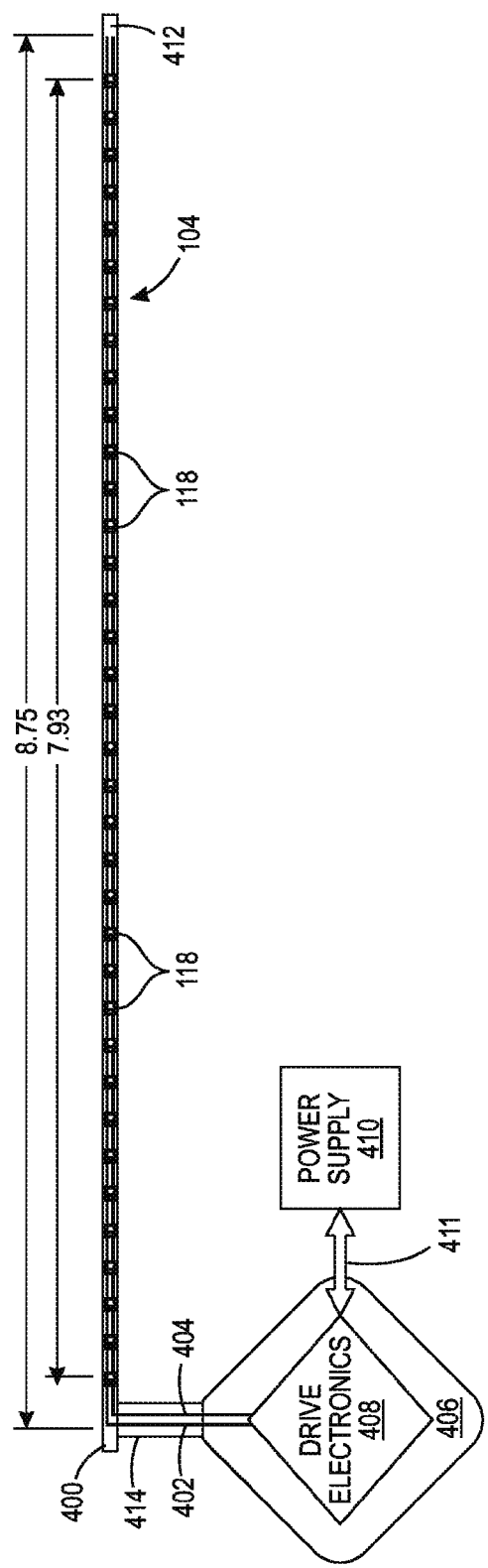
FIGS. 4 and 9 are schematic plan views of light strips in accordance with embodiments of the present teachings.

FIG. 4 is a plan view of the light strip 104 prior to assembly to the sidewall 110 of the pedestal 102. The light strip 104 of this embodiment includes a plurality of discrete light sources 118 such as a plurality of LEDs 118. The plurality of LEDs 118 may be physically connected together with a carrier 400 such as a plastic, polyimide, Kapton®, or other flexible polymer carrier. The plurality of LEDs 118 may further be electrically connected together, in series or parallel, through a ground interconnect 402 that is electrically coupled to a ground connection, and to a power interconnect 404 that is electrically coupled to a power connection. The light strip 104 of FIG. 4 depicts 36 LEDs 118, but may include any number of light sources 118, such as from 36 to 72 LEDs, fewer than 36 or more than 72 LEDs.

The LEDs 118 may be, for example, micro-sized LEDs having a surface area of 2 mm$^2$ or less and a thickness of 1 mm or less. In an embodiment, the LEDs 118 may not be covered by an integral lens as is typically found with LEDs, so that the light output from the LEDs is more omnidirectional than unidirectional, as would be the case if each LED included a separate domed or integral lens. Each LED may have a high power density, with a luminous flux in the range of from about 40 lumens to about 80 lumens, or from about 50 lumens to about 70 lumens, or about 60 lumens. Each LED may have a luminous efficacy in the range of from about 40 to about 55 lumens/watt, although other lumens and efficacies are contemplated.

The light strip 104 can further include a circuit substrate 406. The circuit substrate 406 may include a carrier such as a plastic, polyimide, or other flexible polymer carrier, which may be formed as a continuous layer along with the carrier 400. In another embodiment, the circuit substrate 406 may be a printed circuit board that is electrically coupled with the LEDs 118 through the interconnects 402, 404. In contrast to conventional anti collision lights, the circuit substrate 406 can include integrated driver electronics 408 such as one or more power converters, timers, and/or other control circuitry and integrated power converter/supply circuitry to operate the light sources 118. The circuit substrate 406 is electrically coupled with the aircraft power and/or other aircraft electronics 410 through an electrical interconnect 411. The power supply and/or other aircraft electronics 410 may be part of the aircraft electrical system. In another embodiment, the anti collision lighting 100 may include a separate power supply and/or other electronics. The interconnect 411 may include a wired and/or a wireless connection. In an embodiment, the light sources 118 may be physically attached to a first carrier portion 412 and the driver electronics 408 may be attached to a second carrier portion formed by the carrier substrate 406. The first carrier portion 412 and the second carrier portion 406 may be physically connected together by a third carrier portion 414. A portion of the power interconnect 404 and ground interconnect 402 may be formed on the third carrier portion 414. The dimensions depicted (in inches) in FIG. 4 are not intended to be at all limiting, and will vary depending on, for example, the circumference of the sidewall 110 of the pedestal 102. The first carrier portion 412, second carrier portion 406, and third carrier portion 414 may be a single piece of carrier material, such as a single piece of Kapton®.

Figure 5:
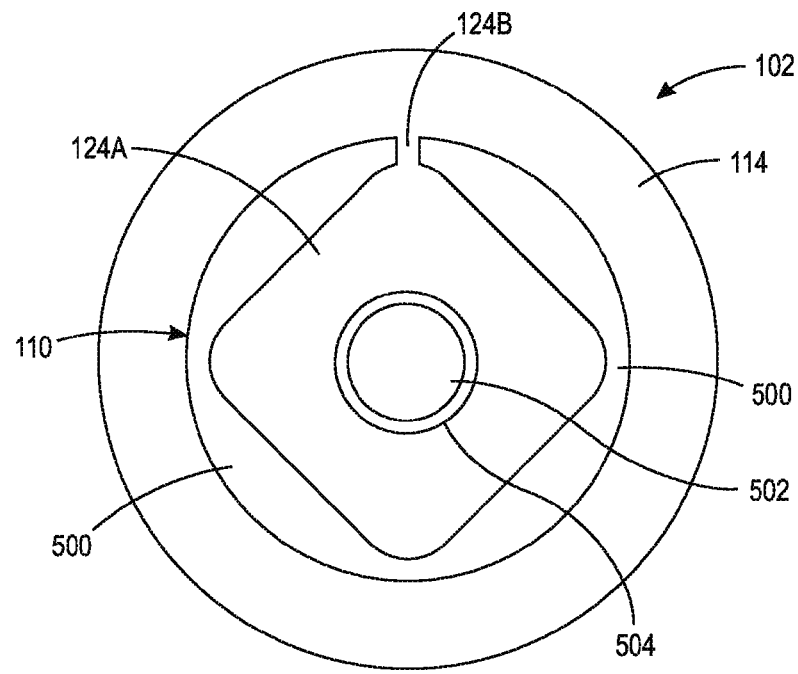
FIGS. 5 and 8 are plan views depicting pedestals in accordance with embodiments of the present teachings.

FIG. 5 is a plan view depicting the pedestal 102. During assembly of the anti collision lighting system 100, the circuit substrate (e.g., the second carrier portion) 406 and driver electronics 408 (FIG. 4) of the light strip 104 are mounted into the first recess 124A. The third carrier portion 414 is routed through the second recess 124B, and the first carrier portion 412 is mounted to the sidewall 110. The circuit substrate 406 is thereby recessed within the top surface 122 of the pedestal 102, such that an upper surface of the circuit substrate 406 does not extend above an uppermost portion 500 of the top surface 122 of the pedestal 102. The circuit substrate 406 may be secured to the pedestal 102 with an adhesive or fasteners (not individually depicted for simplicity), or may be held in place by the lens 106. After assembly, the first intermediate surface 132 of the lens 106 may physically contact and/or overlie the flange 114 of the pedestal 102, and the second intermediate surface 134 of the lens 106 physically contacts and/or overlies the uppermost portion 500 of the pedestal 102 and the circuit substrate 406 of the light strip 104. The electrical interconnect 411 may be routed from the bottom or side of the circuit substrate 406 through an opening 502 in the post 112 of the pedestal 102, and connects to aircraft electronics. An interior lip 504 of the pedestal 102 may be routed through a hole (not depicted for simplicity) in the center of the circuit substrate 406. In another embodiment, the circuit substrate 406 does not include a hole in the center, which provides more space for electronic components. In this embodiment, the electrical interconnect 411 connects to circuitry routed to the bottom of the circuit substrate 406, and the electrical interconnect 411 extends from the bottom surface of the circuit substrate 406 and through the opening 502 in the post 112 of the pedestal 102. In another embodiment, the electrical interconnect 411 may connect to circuitry at the top of the circuit substrate 406, and routed around an edge of the circuit substrate 406 and through the opening 502 in the post 112 of the pedestal 102. The circuit substrate 406 of FIG. 4 may be positioned within the first recess 124A of the pedestal 102 of FIG. 5 on a surface of the base or pedestal 102 which is within a periphery established by the light strip that is mounted to sidewall 110. Other electrical connection routing is contemplated.

Figure 6:
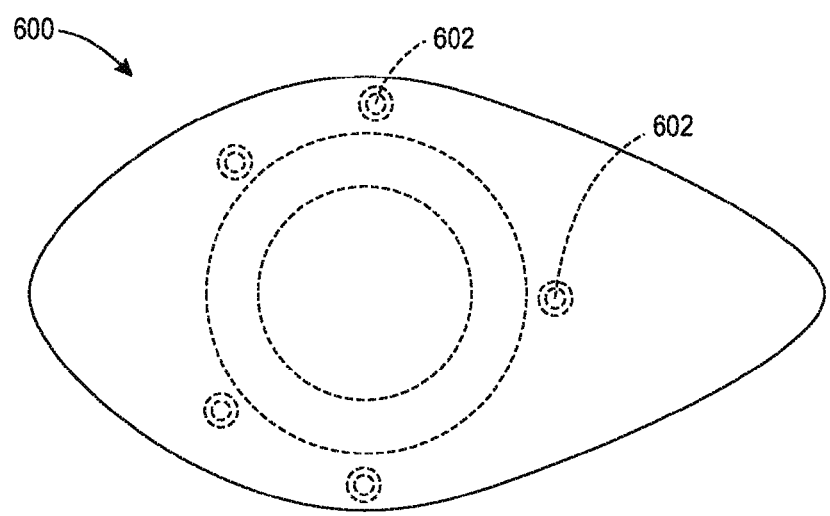
FIGS. 6 and 7 are schematic plan views of lenses in accordance with embodiments of the present teachings.

Various modification to the embodiments depicted and described above will become apparent from the disclosure herein. For example, while FIG. 3 depicts a lens 106 that is round, other lens shapes are contemplated. FIG. 6 is a plan view depicting a lens 600 having an irregular ellipsoid shape that provides an aerodynamic shape and may have reduced drag compared to the round lens 106 of FIG. 3. In this embodiment, the front of the aircraft would be oriented toward the left side of FIG. 6. as depicted. The lens 600 may be mounted, for example, to a pedestal that is analogous to pedestal 102 as depicted in FIGS. 1, 2, and 5. The positioning of countersunk holes 602 may be designed to prevent improper orientation of the lens.

Figure 7:
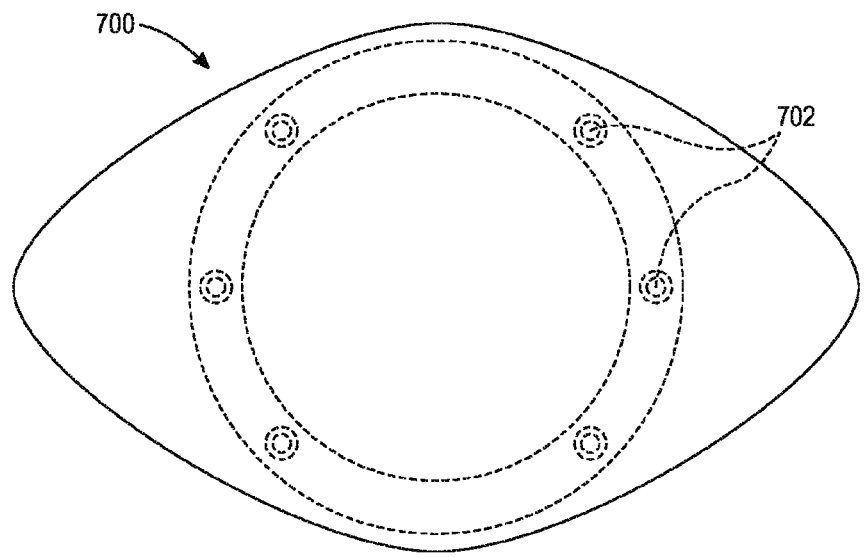

FIG. 7 is a plan view depicting a lens 700 having an ellipsoid shape. This lens 700 may be less expensive to manufacture and install than the lens 600 of FIG. 6, for example because it has a more regular shape and regularly spaced countersunk holes 702, and the lens may be installed correctly in either of two orientations.

Figure 8:
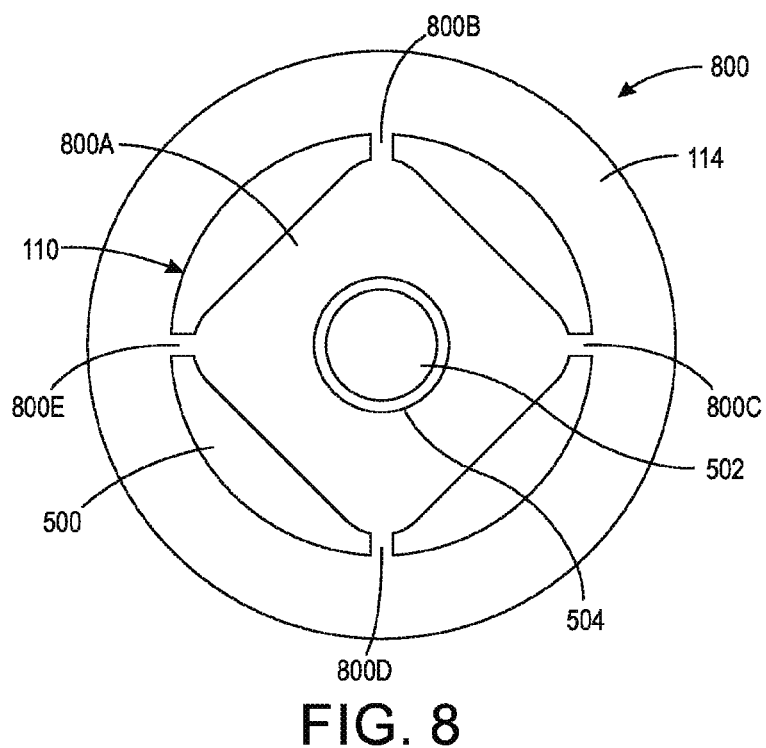
Figure 9:
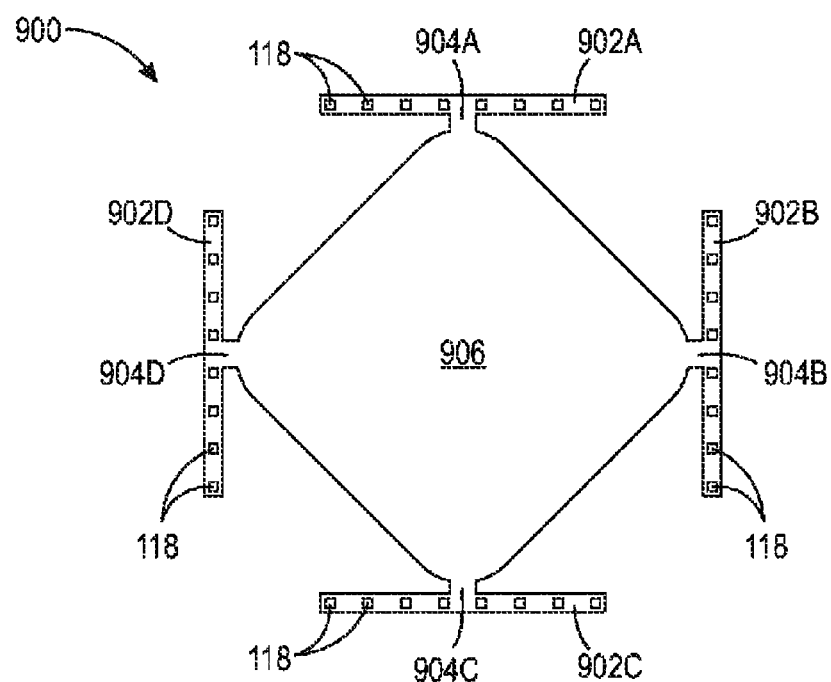

FIG. 8 is a plan view analogous to the plan view of FIG. 5, where the pedestal 800 includes recesses 800A-800E. In this embodiment, a light strip 900 (FIG. 9) would include an array of four light strip segments 902A-902D, where each light strip segment may be individually addressed. While the FIG. 8 structure is adapted for four light strip segments 902A-902D, it will be understood that the anti collision light can be designed for any number of recesses 800 and light strip segments 902. The light strip 900 can include four different carrier portions 904A-904D that are analogous to third carrier portions 414 (FIG. 4). Recess 800A can receive a circuit substrate 906, while recesses 800B-800E can receive carrier portions 904A-904D, where each carrier portion includes power and ground (not individually depicted for simplicity) to selectively power the associated light strip segment. The light strip segments 902A-902D can be wrapped around the sidewall 110 of the pedestal 800. In an embodiment, the four individually addressable light strip segments 902A-902D can be activated and deactivated in turn to, for example, create a rotating beacon effect.

Figure 10:
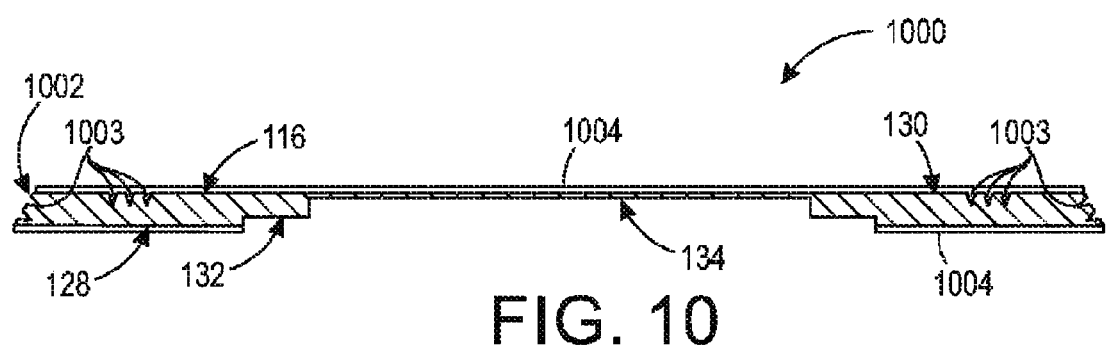
FIG. 10 is a cross section of a lens in accordance with an embodiment of the present teachings.

As discussed above, referring back to FIGS. 1-3, the lens 106 includes the lower surface 128. The lower surface 128 may physically contact a surface 212 of the aircraft surface 202. In another embodiment, a material such as a polymer may be interposed between the lens 106 and the surface 212 of the aircraft. The lens 106 further includes an edge 136 that intersects the lower surface 128 at an angle. In this embodiment, the surface 212 is an exterior surface 202 of the aircraft. As depicted in FIG. 1, the edge 136 intersects the lower surface 128 of the lens at a right angle. In this embodiment, majority of the light that is emitted from the plurality of LEDs 118 will travel through the lens 106 and exit the edge 136 of the lens 106 at a generally horizontal angle relative to the orientation of the aircraft (assuming the lens is on a horizontal surface of the aircraft), or generally normal/perpendicular, or 90° to the top surface 116 of the lens 106. In this embodiment, the light emitted from the anti collision light 100 may exit the edge 136 at generally lower angles, and will therefore be most visible from a low angle relative to the upper surface 116 of the lens 106. The amount of visible light may decrease with an increasing viewing angle that is above the upper surface 116 of the anti collision light 100. Another embodiment of a lens 1000 including a lower surface 128 that physically contacts the exterior surface 212 (FIG. 2) of the aircraft is depicted in FIG. 10. In this embodiment, an edge 1002 of the lens intersects the lower surface 128 at an acute angle, for example at an angle of from about 30° to about 60°, or another angle. In this embodiment, the light that is emitted from the plurality of LEDs 118 will travel through the lens 1000 and exit the edge 1002 of the lens 1000 at a generally non-horizontal angle relative to the orientation of the aircraft (assuming the lens is on a horizontal surface of the aircraft), or non-perpendicular to the top surface 116 of the lens 106. In this embodiment, the light emitted from the anti collision light 100 may exit the edge 136 at a lower angle than the embodiment of the lens 106 of FIG. 1, for example, due to optical refraction as the light transits the interface between the lens and the atmosphere. The acute angle of the edge 1002 may expose the lower surface of the lens 128 to view from above, however, which may increase the amount of light viewable from elevated angles. The light that exits the edge 1002 of the lens 1000 may be most visible from a higher viewing angle relative to the upper surface 116 of the lens 1002 compared to the lens 106 of FIG. 1. The amount of visible light may increase with an increasing viewing angle that is above the upper surface 116 of the anti collision light 1000. In another similar embodiment, the edge 1002 may have a curved profile rather than the straight, angled profile depicted in FIG. 10.

While FIG. 1 depicts surface 136 intersecting surface 116 at a 90° angle, and FIG. 10 depicts surface 1002 intersecting surface 116 at an angle of greater than 90°, surface 1002 may also intersect surface 116 at an angle of less than 90° such that the lens 1000 has an undercut edge.

Additionally, as depicted in FIG. 10, surface 116 and/or edge 1002 may include diffractive elements 1003, such as one or more grooves, indentations, bumps, angled surfaces, or other surface features, that encircle the perimeter of the lens 1000 and tailor the light output from the lens 106, 1000 as desired. These diffractive elements 1003 may help scatter and/or focus the light as it exits the edges 136, 1002 of the lens 106, 1000. It will be understood that the diffractive elements 1003 may not be depicted to scale, and may be relatively smaller or larger than those depicted.

Further, to increase the amount of light that exits the edges 136, 1002 of the lenses 106, 1000, the top surface 116 and/or bottom surface 128 and/or intermediate surface 132 of the lenses 106, 1000 may be coated with a reflective coating 1004, such as a thin, metal coating. This reflective coating can assist in channeling light that is output from the light strip 104 to the edges 136, 1002 of the lenses 106, 1000, and reduces or prevents light from exiting from the surfaces 116, 128, 132. In an embodiment, light output from the edge 116, 1002 of the lens 106, 1000 is maximized, and light output from surfaces 116, 128, 132 is minimized, where possible. Thus the hemispherically directed light emitted by the LEDs is directed radially outward toward the lens edge 136, 1002, as well as toward the upper surface 116, lower surface 128, and intermediate surface 132 of the lens 1000. The lens 1000 inherently reflects light inwardly when emitted toward the inner surfaces of the lens at some angle less than perpendicular, or less than 90 degrees. Light that is emitted from the LEDs in a perpendicular direction toward the lens inner surfaces will generally pass through and out of the lens material. The coating 1004 may thus reduce or prevent the emission of light out of the upper surface 116 and/or the lower surface 128 and/or the intermediate surface 132 of the lens 1000. Preventing the emission of light out of the surfaces 116, 128, 132 of the lens 1000 prevents the "wasting" of light that could otherwise be redirected out the radial sides of the lens to provide a higher light intensity. The coating 1004 may be a monolayer or a few atoms or molecules thick, or another sufficient thickness. The coating 1004 can be selectively applied, or not applied, to the surfaces 116, 128, 132 of the lens adjacent the edges 136, 1002 to selectively direct a portion of the emitted light through the surfaces 116, 128, 132. For example, the top surface 116 can omit the coating on the last 0.25 inches adjacent the edge 136 to allow additional light to be directed through the top surface 116, thus a majority of the emitted light is directed through the edge 136 and a portion of the emitted light is directed through the top surface 116.

In an embodiment, an anti-collision light such as that depicted in FIG. 1, including the pedestal 102, light strip 104, and lens 106, may have a weight of from about 10 ounces (oz.) to about 15 oz., or from about 11 oz. to about 13 oz., or less than about 13 oz. This is in contrast to some conventional anti collision lights for commercial and military aircraft, which may weigh 3 to 4 pounds. Decreasing the weight of the anti collision light decreases aircraft fuel use and aircraft operation costs.

In various embodiments, the lens 106, 600, 700, 1000 may be manufactured from a single piece of material, for example using a molding process. After forming the lens, a coating such as coating 1004 may be applied to the lens.

A light according to one or more embodiments herein can include a light source configured to emit light in three dimensions, and a lens configured to direct a majority of the light emitted by the light source outwardly from the light source in directions along a surface to which the light is attached. The directions the majority of the light is directed along the surface to which it is attached can include all the directions along the surface. In an embodiment, the light defines an area on the surface, the light source is positioned within the area, and the directions include directions radially outward from the light source along the surface.

Figure 11:
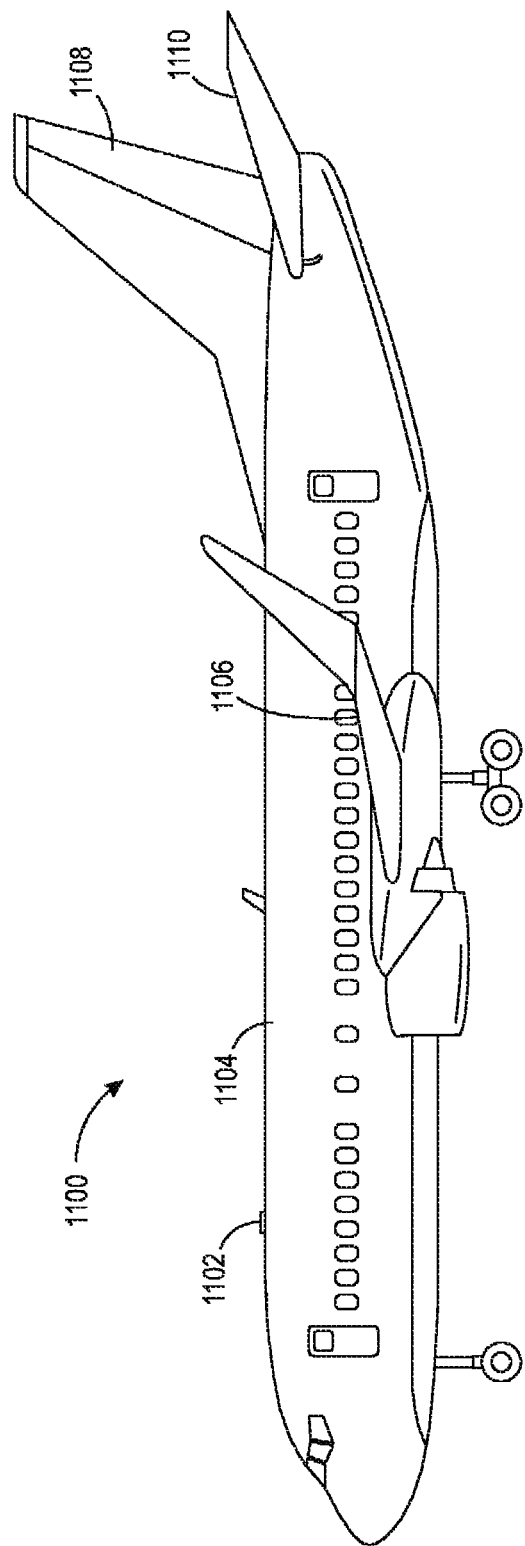
FIG. 11 is a side view of an aircraft having an anti collision lighting system in accordance with an embodiment of the present teachings.

FIG. 11 depicts an aircraft 1100 that includes an anti collision lighting system having one or more anti collision lights 1102 attached to an exterior surface of the aircraft 1100. The one or more anti collision lights 1102 may be attached to an exterior surface of the aircraft 1100, for example, to the fuselage 1104, wings 1106, vertical stabilizer 1108, horizontal stabilizer 1110, and/or another exterior surface of the aircraft 1100. The one or more anti collision lights 1102 may be attached to the aircraft in a horizontal position, a vertical position, or a position between horizontal and vertical.

Notwithstanding that the numerical ranges and parameters setting forth the broad scope of the present teachings are approximations, the numerical values set forth in the specific examples are reported as precisely as possible. Any numerical value, however, inherently contains certain errors necessarily resulting from the standard deviation found in their respective testing measurements. Moreover, all ranges disclosed herein are to be understood to encompass any and all sub-ranges subsumed therein. For example, a range of "less than 10" can include any and all sub-ranges between (and including) the minimum value of zero and the maximum value of 10, that is, any and all sub-ranges having a minimum value of equal to or greater than zero and a maximum value of equal to or less than 10, e.g., 1 to 5. In certain cases, the numerical values as stated for the parameter can take on negative values. In this case, the example value of range stated as "less than 10" can assume negative values, e.g. −1, −2, −3, −10, −20, −30, etc.

While the present teachings have been illustrated with respect to one or more implementations, alterations and/or modifications can be made to the illustrated examples without departing from the spirit and scope of the appended claims. For example, it will be appreciated that while the process is described as a series of acts or events, the present teachings are not limited by the ordering of such acts or events. Some acts may occur in different orders and/or concurrently with other acts or events apart from those described herein. Also, not all process stages may be required to implement a methodology in accordance with one or more aspects or embodiments of the present teachings. It will be appreciated that structural components and/or processing stages can be added or existing structural components and/or processing stages can be removed or modified. Further, one or more of the acts depicted herein may be carried out in one or more separate acts and/or phases. Furthermore, to the extent that the terms "including," "includes," "having," "has," "with," or variants thereof are used in either the detailed description and the claims, such terms are intended to be inclusive in a manner similar to the term "comprising." The term "at least one of" is used to mean one or more of the listed items can be selected. As used herein, the term "one or more of" with respect to a listing of items such as, for example, A and B, means A alone, B alone, or A and B. The term "at least one of" is used to mean one or more of the listed items can be selected. Further, in the discussion and claims herein, the term "on" used with respect to two materials, one "on" the other, means at least some contact between the materials, while "over" and "overlie" mean the materials are in proximity, but possibly with one or more additional intervening materials such that physical contact is possible but not required. Neither "on" nor "over" implies any directionality as used herein. The term "conformal" describes a coating material in which angles of the underlying material are preserved by the conformal material. The term "about" indicates that the value listed may be somewhat altered, as long as the alteration does not result in nonconformance of the process or structure to the illustrated embodiment. Finally, "exemplary" indicates the description is used as an example, rather than implying that it is an ideal. Other embodiments of the present teachings will be apparent to those skilled in the art from consideration of the specification and practice of the disclosure herein. It is intended that the specification and examples be considered as exemplary only, with a true scope and spirit of the present teachings being indicated by the following claims.

Terms of relative position as used in this application are defined based on a plane parallel to the conventional plane or working surface of a workpiece, regardless of the orientation of the workpiece. The term "horizontal" or "lateral" as used in this application is defined as a plane parallel to the conventional plane or working surface of a workpiece, regardless of the orientation of the workpiece. The term "vertical" refers to a direction perpendicular to the horizontal. Terms such as "on," "side" (as in "sidewall"), "higher," "lower," "over," "top," and "under" are defined with respect to the conventional plane or working surface being on the top surface of the workpiece, regardless of the orientation of the workpiece.

The invention claimed is:

1. A lighting system configured to be coupled to a surface, the lighting system comprising:
    a light source configured to emit light in three dimensions; and
    a lens comprising:
        a first surface having a first plane;
        a second surface opposite the first surface and having a second plane; and
        a third surface having a third plane at a level interposed between a level of the first plane of the first surface and a level of the second plane of the second surface, wherein:
        the lens is configured to direct a majority of the light emitted by the light source outwardly from the light source in directions along the surface;
        the third surface defines at least a portion of a recess in the lens, wherein the light source is positioned within the recess; and
        the first plane, the second plane, and the third plane are substantially parallel with each other.

2. The lighting system according to claim 1, wherein the directions the majority of the light is directed along the surface comprise all the directions along the surface.

3. The lighting system according to claim 1, wherein:
    the lens defines an area on the surface;
    the light source is positioned within the area; and
    the directions comprise directions radially outward from the light source along the surface.

4. The lighting system of claim 1, wherein the lens comprises an edge having a height, and the height of the edge is equal to 7.0 times a width of one LED, or less.

5. The lighting system of claim 1, wherein the lighting system is configured to protrude from the surface by a distance equal to 7.0 times a width of one LED, or less.

6. The lighting system of claim 1, wherein the light source comprises a plurality of light emitting diodes (LEDs).

7. The lighting system of claim 1, wherein the light source comprises a plurality of light emitting diodes (LEDs) and the lighting system further comprises a continuous polymer carrier that physically connects the plurality of LEDs into a light strip.

8. The lighting system according to claim 1, further comprising an anti collision light for an aircraft, comprising:
    the light source comprises a plurality of light emitting diodes (LEDs), wherein each LED of the plurality of LEDs comprises a light emitting surface configured to emit light and a width across the front surface; and
    the first surface of the lens is configured to cover the plurality of LEDs and an exterior surface of the aircraft; and
    the lens further comprises an edge having a height that extends between, and intersects, the first surface and the second surface, wherein the lens is configured to focus the majority of the light emitted from the plurality of LEDs outward through the edge.

9. The lighting system of claim 8, further comprising a base, the base comprising a mounting surface, wherein the plurality of LEDs are positioned between the mounting surface and the lens.

10. The lighting system of claim 9, further comprising:
    a continuous polymer carrier that physically connects the LEDs into a light strip; and
    a circuit substrate electrically coupled to the light strip, wherein the circuit substrate is positioned on a surface of the base within a periphery established by the light strip.

11. The lighting system of claim 10, wherein the base further comprises a post configured to extend through an opening in an exterior surface of an aircraft.

12. The lighting system of claim 11, wherein:
    the post further comprises a channel therethrough;
    the circuit substrate comprises an electrical interconnect electrically coupled with the circuit substrate; and
    the electrical interconnect extends through the channel in the post.

13. The lighting system of claim 12, further comprising at least one fastener that attaches the lens to the base, and extends through a first opening through the lens and a second opening through the base.

14. The lighting system of claim 13, wherein the at least one fastener is configured to attach the lens and the base to an aircraft surface, and extend through a third opening through the aircraft surface.

15. The lighting system of claim 1, wherein the lens further comprises an edge that intersects the first surface and the second surface, and the edge intersects the first surface of the lens at an angle of 90°.

16. The lighting system of claim 1, wherein the lens further comprises an edge that intersects the first surface and the second surface, and the edge intersects the first surface of the lens at an angle of from 30° to 60°.

17. An aircraft comprising an anti collision lighting system, the anti collision lighting system comprising at least one anti collision light, comprising:

a light source configured to emit light in three dimensions;
a lens configured to direct a majority of the light emitted by the light source outwardly from the light source in directions along a surface of the aircraft, the lens comprising:
an upper surface;
a lower surface;
an edge that extends between, and intersects, the upper surface and the lower surface; and
an intermediate surface at a level between the lower surface and the upper surface, the intermediate surface defining at least a portion of a recess; and
a pedestal, comprising:
a mounting surface wherein the light source is mounted to the mounting surface, and the mounting surface is positioned adjacent the recess;
a flange that intersects a sidewall of the mounting surface; and
wherein the anti collision light is attached to the surface of the aircraft.

18. The aircraft of claim 17, wherein:
the anti collision light is configured to protrude from the surface of the aircraft by a distance of 0.5 inches or less.

19. The aircraft of claim 17, wherein:
the anti collision light is configured to protrude from the surface of the aircraft by a distance of 0.185 inches or less.

20. The aircraft of claim 17, further comprising at least one fastener that attaches the lens to the pedestal and to the aircraft surface, and extends through a first opening through the lens, a second opening through the flange, and a third opening in the aircraft surface.

21. A method of directing light from a lighting system, comprising:
mounting a light source to a mounting surface of a pedestal, wherein the light source comprises a front surface configured to emit light and a width across the front surface;
attaching a lens to the pedestal, wherein the lens comprises:
a lower surface;
an upper surface opposite the lower surface; and
an edge having a height that extends between, and intersects, the lower surface and the upper surface, wherein the height of the edge is equal to 7.0 times the width across the front surface of the light source, or less;
directing the light source to emit light in three dimensions; and
redirecting a majority of the light emitted by the light source outwardly from the light source through lens in directions along a surface to which the light source is attached.

22. The method of claim 21, wherein:
the light source comprises a plurality of light emitting diodes (LEDs);
the front surface is a front surface of one of the LEDs;
the lower surface of the lens is configured to overlie the plurality of LEDs;
the method further comprises encasing the plurality of LEDs within the lens, wherein the lighting system is configured to emit the light from the plurality of LEDs, through the lens, and out of the edge of the lens.

23. The method of claim 22, further comprising attaching the light source and the lens to an exterior surface of an aircraft wherein, subsequent to the attaching, the light source and the lens protrude from the exterior surface of the aircraft by a distance equal to 7.0 times the width of one LED, or less.

24. The method of claim 23, further comprising attaching the pedestal to the exterior surface of the aircraft using a plurality of fasteners.

25. The method of claim 21, wherein the light source comprises a plurality of light emitting diodes (LEDs).

26. An anti collision light for an aircraft, comprising:
a pedestal comprising a mounting surface and a post, where the post is configured to extend through an opening in an exterior surface of the aircraft;
a light source attached to the mounting surface of the pedestal;
a lens, comprising:
a lower surface configured to overlie an exterior surface of the aircraft;
an upper surface opposite the lower surface;
an edge that extends between, and intersects, the lower surface and the upper surface, wherein the anti collision light is configured to protrude from the exterior surface of the aircraft by a distance of 0.5 inches or less; and
a recess in the lens, wherein the mounting surface of the pedestal and the light source is positioned within the recess in the lens during operation of the anti collision light.

27. A lighting system configured to be coupled to a surface, the lighting system comprising:
a pedestal comprising:
a flange configured to be coupled to the surface; and
a raised mounting surface having a sidewall, wherein the flange intersects the sidewall of the mounting surface;
a light source configured to emit light in three dimensions, wherein the light source is coupled to the sidewall of the mounting surface;
a lens configured to direct a majority of the light emitted by the light source outwardly from the light source in directions along the surface; and
a reflective coating on a surface of the lens that reflects light emitted by the light source back into the lens.

* * * * *